(12) United States Patent
Miller et al.

(10) Patent No.: US 8,812,065 B2
(45) Date of Patent: Aug. 19, 2014

(54) SYSTEM AND METHOD FOR MONITORING THE LOCATION OF A COMMUNICATION DEVICE IN A VEHICLE BASED ON SIGNAL STRENGTH

(75) Inventors: Thomas Lee Miller, Ann Arbor, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 13/112,225

(22) Filed: May 20, 2011

(65) Prior Publication Data

US 2011/0300843 A1 Dec. 8, 2011

Related U.S. Application Data

(60) Provisional application No. 61/352,251, filed on Jun. 7, 2010, provisional application No. 61/361,621, filed on Jul. 6, 2010.

(51) Int. Cl.
*H04M 1/00* (2006.01)

(52) U.S. Cl.
USPC .......... 455/575.9; 455/456.1; 455/569.2; 455/456.4; 455/456.6; 455/420; 340/995.13; 342/59

(58) Field of Classification Search
USPC .......... 455/456.1, 569.2, 456.4, 456.6, 420, 455/575.9; 342/59
See application file for complete search history.

(56) References Cited

U.S. PATENT DOCUMENTS

| | | | |
|---|---|---|---|
| 6,028,537 | A | 2/2000 | Suman et al. |
| 6,278,772 | B1 | 8/2001 | Bowater et al. |
| 6,385,535 | B2 | 5/2002 | Ohishi et al. |
| 6,411,899 | B2 | 6/2002 | Dussell et al. |

(Continued)

FOREIGN PATENT DOCUMENTS

| | | |
|---|---|---|
| JP | 2007205872 A | 8/2007 |
| JP | 2008172820 A | 7/2008 |
| WO | 03107129 A2 | 12/2003 |
| WO | 2011016886 A1 | 2/2011 |

OTHER PUBLICATIONS

Ford Motor Company, "SYNC with Navigation System," Owner's Guide Supplement, SYNC System Version 1 (Jul. 2007).

(Continued)

*Primary Examiner* — Wayne Cai
*Assistant Examiner* — Chuck Huynh
(74) *Attorney, Agent, or Firm* — Brooks Kushman P.C.; Jennifer M. Stec

(57) ABSTRACT

A system for locating a personal communication device (PCD) in a vehicle is provided. A controller is configured to receive a first signal from the PCD at a first antenna in a driver zone and to generate a first signal strength value for the first signal. The controller is configured to receive the first signal from the PCD at the second antenna and to generate a second signal strength value for the first signal. The controller is configured to determine whether the first signal at the first antenna and the second signal at the second antenna are received within a predetermined amount of time of one another and to compare the first signal strength value to the second signal strength value if the first signal at the first antenna and the second signal at the second antenna are received within the predetermined amount of time.

15 Claims, 6 Drawing Sheets

(56) References Cited

U.S. PATENT DOCUMENTS

| | | |
|---|---|---|
| 6,459,969 B1 | 10/2002 | Bates et al. |
| 6,505,780 B1 | 1/2003 | Yassin et al. |
| 6,600,975 B2 | 7/2003 | Moriguchi et al. |
| 6,690,956 B2 | 2/2004 | Chua et al. |
| 6,993,490 B2 | 1/2006 | Chen et al. |
| 7,120,928 B2 | 10/2006 | Sheth et al. |
| 7,139,722 B2 | 11/2006 | Perrella et al. |
| 7,142,664 B2 | 11/2006 | Seligmann |
| 7,145,998 B1 | 12/2006 | Holder et al. |
| 7,283,813 B2 | 10/2007 | Hamanaga et al. |
| 7,346,630 B2 | 3/2008 | Eichstaedt et al. |
| 7,376,226 B2 | 5/2008 | Holder et al. |
| 7,433,714 B2 | 10/2008 | Howard et al. |
| 7,444,384 B2 | 10/2008 | Horvitz |
| 7,469,827 B2 | 12/2008 | Katragadda et al. |
| 7,471,929 B2 | 12/2008 | Fujioka et al. |
| 7,474,264 B2 | 1/2009 | Bolduc et al. |
| 7,586,956 B1 | 9/2009 | Mishra et al. |
| 7,813,950 B2 | 10/2010 | Perrella et al. |
| 7,889,096 B2 | 2/2011 | Breed |
| 7,957,773 B2 | 6/2011 | Chua et al. |
| 8,131,205 B2 | 3/2012 | Rosen |
| 2002/0107032 A1 | 8/2002 | Agness et al. |
| 2004/0073643 A1 | 4/2004 | Hayes et al. |
| 2004/0135669 A1 | 7/2004 | Muench-Casanova |
| 2004/0192270 A1 | 9/2004 | Kreitzer |
| 2004/0198306 A1* | 10/2004 | Singh et al. ............ 455/345 |
| 2004/0220768 A1 | 11/2004 | Klein |
| 2005/0019228 A1 | 1/2005 | Myers et al. |
| 2005/0088284 A1 | 4/2005 | Zai et al. |
| 2006/0058948 A1 | 3/2006 | Blass et al. |
| 2006/0077035 A1* | 4/2006 | Mamaloukas ........... 340/5.61 |
| 2006/0290490 A1 | 12/2006 | Kraus et al. |
| 2007/0042812 A1 | 2/2007 | Basir |
| 2007/0120948 A1 | 5/2007 | Fujioka et al. |
| 2007/0124043 A1 | 5/2007 | Ayoub et al. |
| 2007/0285256 A1 | 12/2007 | Batra |
| 2008/0057927 A1 | 3/2008 | Han |
| 2008/0086455 A1 | 4/2008 | Meisels et al. |
| 2008/0319653 A1 | 12/2008 | Moshfeghi |
| 2008/0319665 A1 | 12/2008 | Berkobin et al. |
| 2009/0005966 A1 | 1/2009 | McGray et al. |
| 2009/0075624 A1 | 3/2009 | Cox et al. |
| 2009/0111422 A1 | 4/2009 | Bremer et al. |
| 2009/0144622 A1 | 6/2009 | Evans et al. |
| 2009/0248285 A1 | 10/2009 | Bauer |
| 2009/0267757 A1 | 10/2009 | Nguyen |
| 2009/0312901 A1 | 12/2009 | Miller et al. |
| 2010/0035632 A1* | 2/2010 | Catten ................. 455/456.1 |
| 2010/0062714 A1 | 3/2010 | Ozaki |
| 2010/0136944 A1 | 6/2010 | Taylor et al. |
| 2010/0148920 A1 | 6/2010 | Philmon et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2011/0021234 A1 | 1/2011 | Tibbitts et al. |
| 2011/0039581 A1 | 2/2011 | Cai et al. |
| 2011/0045810 A1 | 2/2011 | Issa et al. |
| 2011/0077032 A1 | 3/2011 | Correale et al. |
| 2011/0105082 A1 | 5/2011 | Haley |
| 2011/0137520 A1 | 6/2011 | Rector et al. |
| 2011/0137773 A1 | 6/2011 | Davis, III et al. |
| 2011/0176670 A1 | 7/2011 | Kaplan et al. |
| 2011/0257973 A1 | 10/2011 | Chutorash et al. |
| 2011/0300884 A1 | 12/2011 | Ollila et al. |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

jNetX Call Reminder for BlackBerry. Feb. 17, 2009. Retrieved from: http://www.pocketberry.com/2009/02/17/jnetx-call-reminder-for-blackberry/.

AppManiax, Inc. "PhonePlus Callback". http://www.handango.com/catalog/ProductDetails.jsp?productId=254405&platformId=80.

Christoph Hammerschmidt, MELEXIS, The Sky's The Limit, Continental NXP to integrate NFC into cars, Feb. 17, 2011, http://automotive-eetimes.com/en/continental-nxp-to-integrate-nfc-into-cars.html?cmp_id=.

Blackberry, Blackberry Curve Series Blackberry Curve 9300/9330 Smartphones, User Guide Version 6.0, www.blackberry.com/docs/smartphones.

* cited by examiner

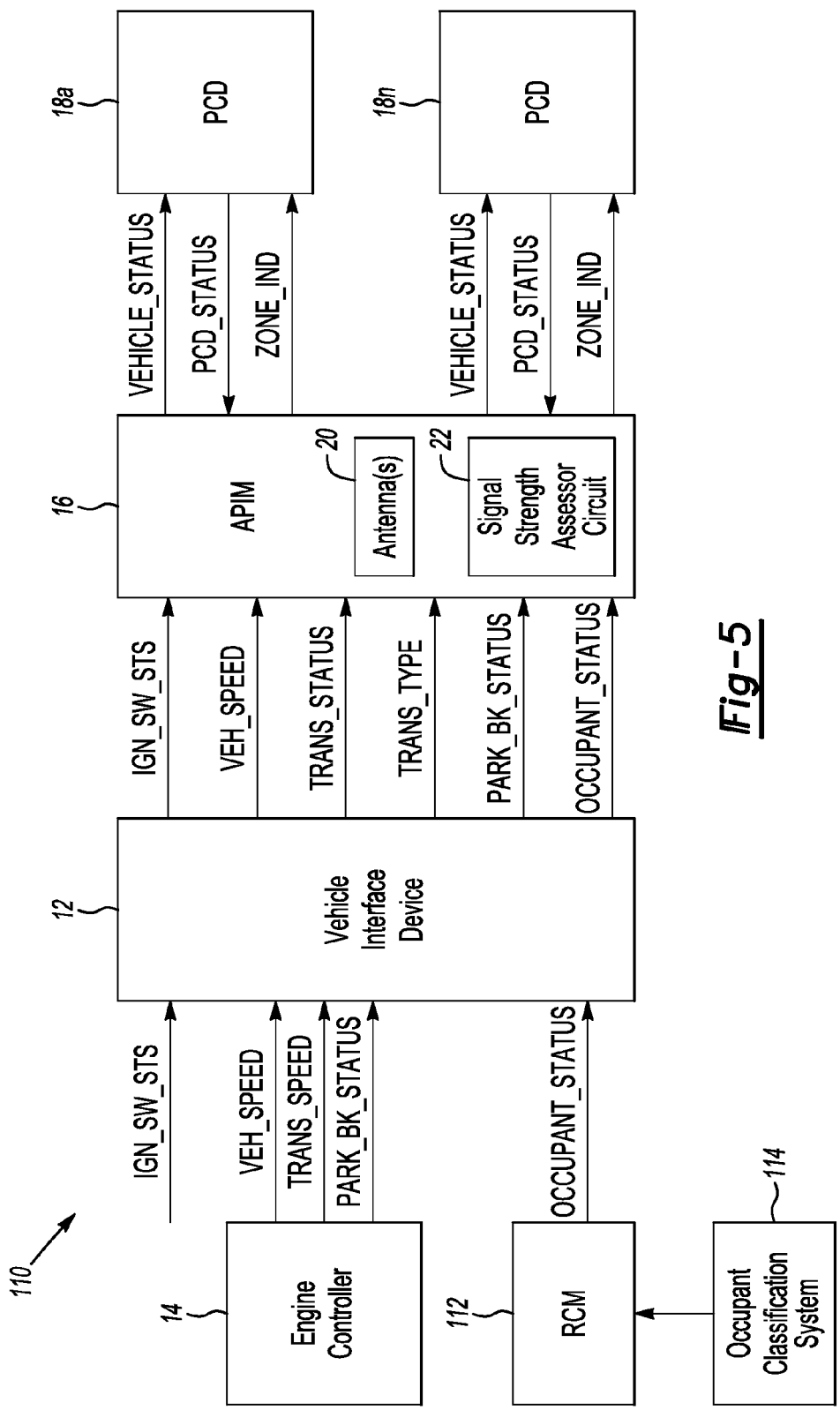

SYSTEM AND METHOD FOR MONITORING THE LOCATION OF A COMMUNICATION DEVICE IN A VEHICLE BASED ON SIGNAL STRENGTH

CROSS-REFERENCE TO RELATED APPLICATIONS

This application claims the benefit of U.S. provisional application Ser. Nos. 61/352,251 filed on Jun. 7, 2010 and 61/361,621 filed on Jul. 6, 2010, which are hereby incorporated by reference in their entirety.

TECHNICAL FIELD

Embodiments disclosed herein generally relate to a system and method for monitoring the location of a communication device in a vehicle based on signal strength.

BACKGROUND

It is known to restrict cell phone usage for a driver in a vehicle. An example of such an implementation is disclosed in co-pending International Application No. PCT/US2010/034030 ("the '030 publication") to Miller et al., filed on May 5, 2010. It is also known to detect if a cell phone is in use in a vehicle. U.S. Pat. No. 7,474,264 ("the '264 patent") to Bolduc et al. discloses a system and method that detects the use of radio frequency (RF) transmit devices (e.g., cellular phones) in a vehicle.

The '264 patent further discloses that the system includes a first RF antenna for detecting signal strength of an RF signal transmit device at a first location in a vehicle and a power first detector for generating a first output signal indicative thereof. The system also includes a second antenna for detecting signal strength of the RF signals at a second location in the vehicle and a second power detector for generating a second output signal indicative thereof. The system further includes a signal processor for processing the first and second output signals to determine the presence of an RF transmit device in use in the vehicle and to further determine the location of the RF transmit device to determine if a driver is using the device.

Additional references that may be informative with respect to vehicle cell phone restriction include: U.S. Publication Nos. 2010/0148920 and 2011/0021234.

SUMMARY

A system for locating a personal communication device (PCD) in a vehicle is provided. The system includes a controller that is configured to receive a first signal from the PCD at a first antenna in a driver zone and to measure a signal strength of the first signal received at the first antenna to generate a first signal strength value. The controller is configured to receive the first signal from the PCD at a second antenna and to measure a signal strength of the first signal received at the second antenna to generate a second signal strength value. The controller is configured to determine whether the first signal at the first antenna and the second signal at the second antenna are received within a predetermined amount of time of one another and to compare the first signal strength value to the second signal strength value if the first signal at the first antenna and the second signal at the second antenna are received within the predetermined amount of time. The controller is configured to determine whether the PCD is in one of the driver zone and the passenger zone based on the comparison of the first signal strength value to the second signal strength value.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

FIG. 5 depicts a system for monitoring the location of the PCD in accordance to another embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The notion of restricting cell phone usage in a vehicle is known. While it is suggested that vehicles adopt implementations to restrict cell phone usage for drivers while the vehicle is being driven, such implementations may consider ensuring that passengers in the vehicle are free to engage in cell phone activity as desired since these occupants are not responsible for driving the vehicle. These implementations may consider enabling cell phone usage for the driver in moments in which the vehicle is "parked" and/or temporarily in a "stopped" condition. The embodiments as set forth establish driver and passenger zones such that a cell phone detected to be in the driver zone by way of signal strength can be restricted and that a cell phone detected to be in a passenger zone also by way of signal strength can operate as desired. Moreover, vehicle operating conditions may be monitored so that the driver can utilize his/her cell phone within the driver zone in moments when the vehicle is in park or other temporary stopped condition. Further, occupant detection may be utilized to determine the number of passengers in the vehicle to determine whether to increase the size of the driver zone to prevent the driver from leaning over into a passenger zone to avoid cell phone restriction.

The embodiments set forth generally illustrate and describe a plurality of controllers (or modules), or other such electrically based components. All references to the various controllers and electrically based components and the functionality provided for each, are not intended to be limited to encompassing only what is illustrated and described. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. It is generally recognized that each controller and/or module/device disclosed may include, but not limited to, any number of microprocessors, ICs, memory devices (e.g., FLASH, RAM, ROM, EPROM, EEPROM, or other suitable variants thereof), and software which co-act with one another to perform the various functions set forth below.

Figure 1:
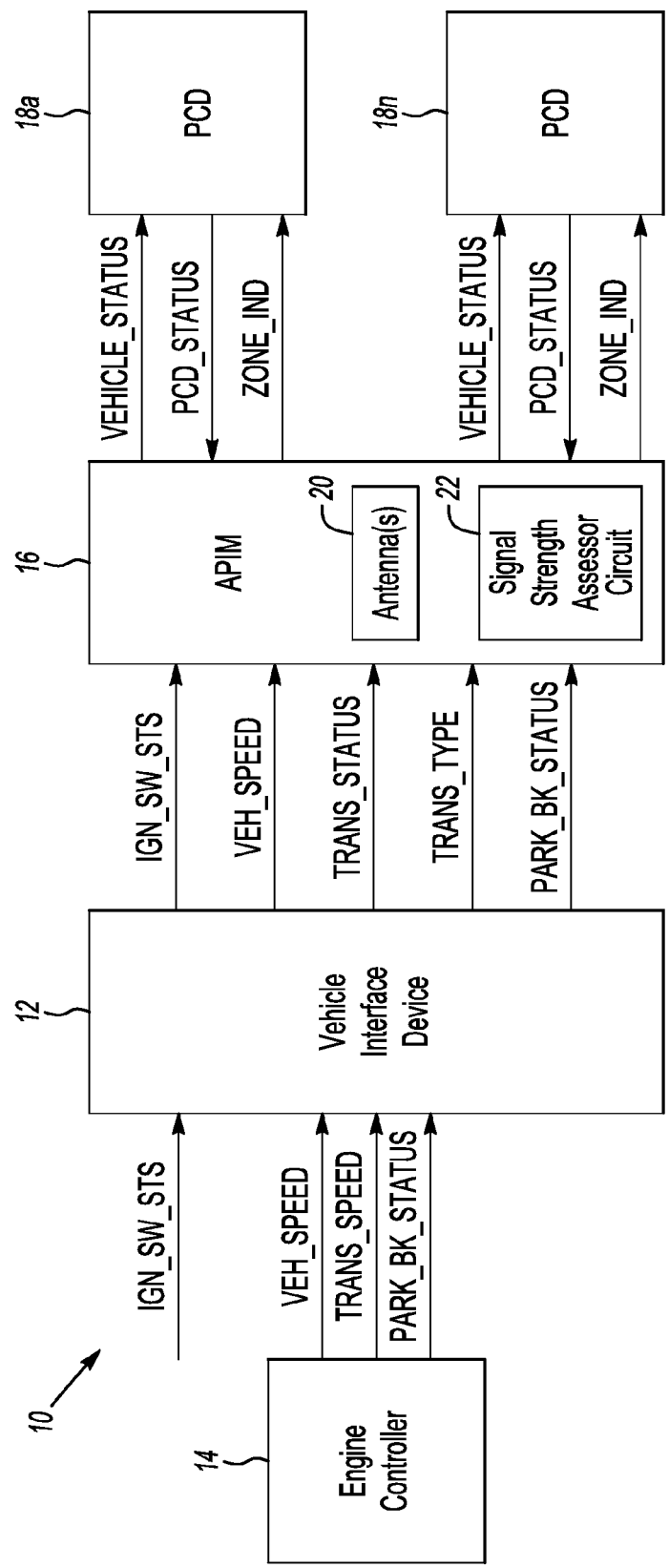
FIG. 1 depicts a system for monitoring the location of a personal communication device (PCD) in accordance to one embodiment.

FIG. 1 depicts a system 10 for monitoring the location of a personal communication device (PCD) in accordance to one embodiment. The system 10 includes a vehicle interface device 12, an engine controller 14, and an auxiliary protocol interface module (APIM) (or controller) 16. The vehicle interface device 12 may be implemented as user interface, which provides information related to various states of vehicle functionality to the driver. For example, the device 12 may include a display and/or audible mechanism that provides status or warning messages to the driver and/or as a switch device (e.g., touch screen, voice input, or other suitable device) that enables the driver to select/input vehicle functions/features.

The device 12, the engine controller 14, and the controller 16 may transmit signals to and from one another via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys (not shown). The device 12 may receive a signal IGN_SW_STS from a body controller (not shown) to determine the position of the ignition switch. The engine controller 14 transmits a signal VEH_SPD to device 12. The signal VEH_SPD corresponds to the speed of the vehicle. The engine controller 14 also transmits a signal TRANS_STATUS and a signal PARK_BK_STATUS to the device 12. The signal TRANS_STATUS corresponds to whether the transmission is in a PARK (P), Reverse (R), Neutral (N), Drive (D), or Low (L) state. The signal PARK_BK_STATUS corresponds to whether a park brake (not shown) is engaged. The signal PARK_BK_STATUS may be of interest in the event the vehicle is equipped with a manual transmission. For example, if the signal PARK_BK_STATUS indicates that the park brake is engaged, such a condition may correspond to the vehicle being in a parked state while the vehicle is equipped with a manual transmission. It may not be possible for a manual transmission to provide transmission status. This aspect will be discussed in more detail below.

The device 12 may transmit the signals IGN_SW_STS, VEH_SPD, TRANS_STATUS, and PARK_BK_STATUS to the controller 16. The device 12 may also transmit a signal TRANS_TYPE which corresponds to the type of transmission that is equipped in the vehicle. For example, the vehicle may include an automatic transmission or a manual transmission. It is recognized that all of the signals noted above may be transmitted directly to the APIM 16 from the engine controller 14.

The controller 16 may be wirelessly coupled to any number of portable communication devices (PCDs) 18a-18n ("18") via a Bluetooth protocol or other suitable interface. Each PCD 18 may be a cell phone or other suitable alternative. The controller 16 is part of an in-vehicle communication system (and includes at least one transmitter (not shown) and at least one receiver (not shown)) which interfaces with each PCD 18 to enable voice input control to perform a function with the PCD 18 so that the driver does not have to enter data directly into the PCD 18. The controller 16 may allow the user to operate a PCD 18 either in a handheld mode (e.g., manual mode) or in a voice control mode (e.g., w/o touch input control). The controller 16 may interface via switches (not shown) positioned within the vehicle to enable touch selection control to perform a function with the PCD 18 so that the driver does not have to enter data directly into the PCD 18. In one example, the controller 16 may be implemented as part of the SYNC system developed by Ford Motor Company® and Microsoft®. Switches may be positioned on the controller 60, the vehicle's steering wheel (not shown) or on the device 12 to enable touch input.

The controller 16 may include at least one antenna 20 for receiving a signal PCD_STATUS from each PCDs 18 located in the vehicle. The signal PCD_STATUS is a Bluetooth based signal and generally includes data corresponding to a device name for the PCD 18. This is used to notify the controller 16 of the identity of the PCD 18. In one example, each PCD 18 may be pre-programmed to the controller 16 so that the controller 16 and the PCD 18 can recognize signal transmission between one another. In another example, an open communication dialog may be enabled to allow the controller 16 and the PCD 18 to communicate (e.g., no pre-programming of the PCD to the controller 16 may be required). The signal strength of the Bluetooth based signal PCD_STATUS may be determined by the APIM 16. It is recognized that the at least one antenna 20 may be positioned exterior to the controller 16 or in any internal/external combination thereof for receiving the signals PCD_STATUS. The placement of the at least one antenna 20 may vary based on the desired criteria of a particular implementation. The controller 16 may include a signal strength assessor circuit 22 for determining the signal strength for each signal PCD_STATUS received at the at least one antenna 20.

Figure 2:
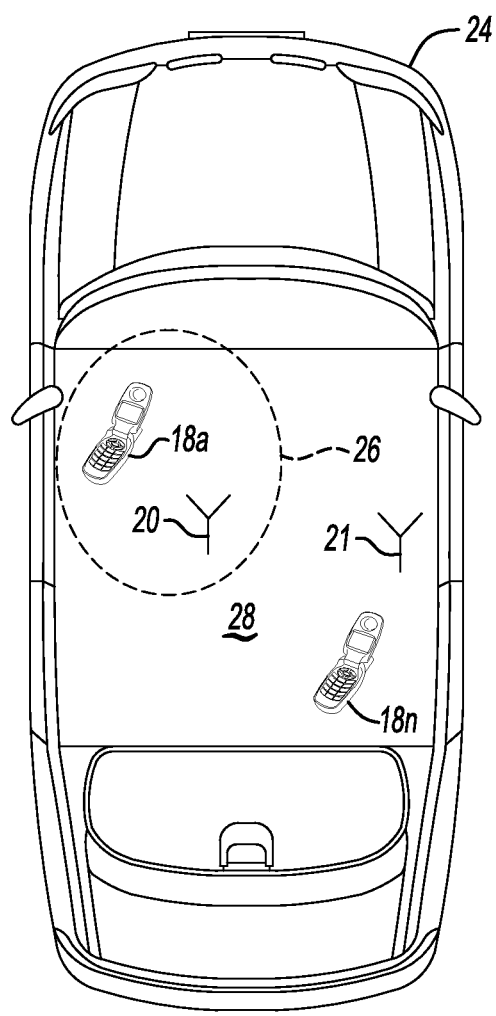
FIG. 2 depicts a vehicle having a driver zone and a passenger zone in a multi-antenna arrangement in a vehicle in accordance to one embodiment.

FIG. 2 depicts a vehicle 24 having a driver zone 26 and a passenger zone 28 in a multi-antenna 20 arrangement in accordance to one embodiment. A first antenna 20 may be positioned within the driver zone 26 (e.g., about the driver's seat or within the interior of the driver's side of the vehicle 24) and a second antenna 21 may be positioned within the passenger zone 28 (e.g., about the passenger's seat or within the interior of the passenger's side of the vehicle 24). The manner in which the controller 16 determines that the PCD 18 is in the driver zone 26 and/or the passenger zone 28 will be described in more detail in connection with FIG. 3.

Referring back to FIG. 1, the APIM 16 transmits a signal ZONE_IND to each PCD 18 to notify the same as to which zone that PCD 18 is in. The controller 16 associates the particular zone to each device name as received on each signal PCD_STATUS and transmits the signal ZONE_IND to the corresponding PCD 18 to notify each PCD 18 of the zone it is in. The controller 16 also transmits a signal VEHICLE_STATUS to the PCD 18 that is detected to be in the driver zone 26. The signal VEHICLE_STATUS corresponds to whether the driver is "active" (e.g., vehicle is moving where vehicle speed is above predetermined threshold (or vehicle is not in PARK)) or "inactive" (e.g., vehicle speed is below a predetermined threshold or vehicle is in PARK). The controller 16 monitors the signals IGN_SW_STS, VEH_SPEED, TRANS_SPEED, TRANS_TYPE and/or PARK_BK_STATUS to determine whether the vehicle (or driver) is active or inactive.

In the event the signal VEHICLE_STATUS indicates that the PCD 18 is in the driver zone 26 and the VEHICLE_STATUS indicates that the driver is active, then the PCD 18 may disable its operation or only allow itself to operate via voice control (or hands free) in conjunction with the APIM 16.

Figure 3:
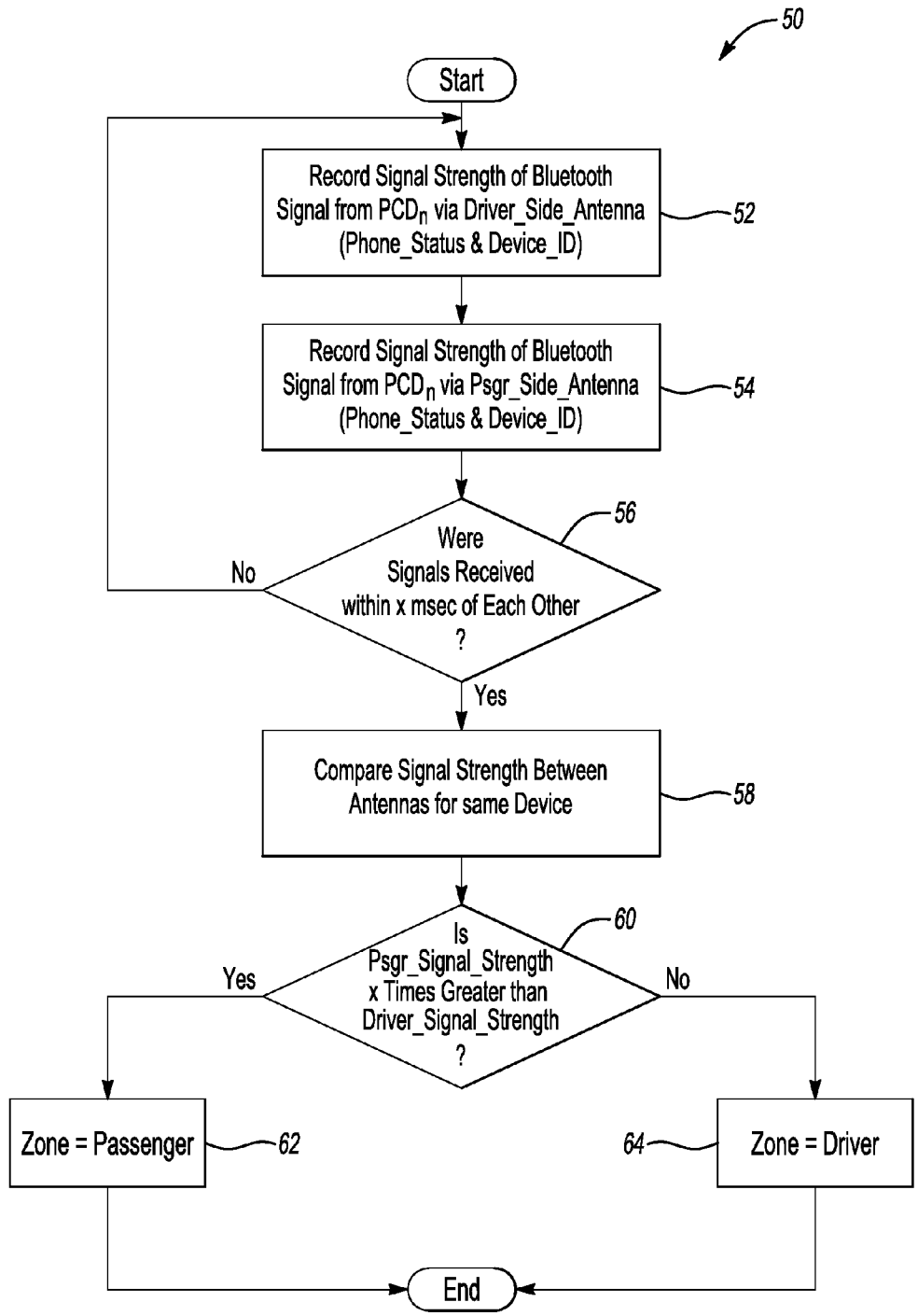
FIG. 3 depicts a method for determining whether the PCD is located in a driver zone or a passenger zone in accordance to one embodiment.

FIG. 3 depicts a method 50 for determining whether the PCD 18 is located in the driver zone 26 or the passenger zone 28 in accordance to one embodiment. The particular order of the operations in the method 50, when executed, may be in any order and are not intended to be limited to only being performed sequentially. The order of the operations may be modified or varied based on the desired criteria of a particular implementation.

In operation 52, the controller 16 records the signal strength of the signal PCD_STATUS as received at the antenna 20 located in the driver zone 26.

In operation 54, the controller 16 records the signal strength of the signal PCD_STATUS as received at the antenna 21 located in the passenger zone 28.

In operation 56, the controller 16 determines whether the signals PCD_STATUS as received in the driver zone 26 and in the passenger zone 28 were received within a predetermined amount of time of one another (e.g., x msec or other suitable value). If the above condition is not true, then the method 50 moves back to operation 52. If the above condition is true, then the method 50 moves to operation 58.

In operation 58, the controller 16 compares the recorded signal strength as received at the antenna 20 and the antenna 21 as received by the same PCD 18 (each antenna 20 and 21 will receive the signal PCD_STATUS from a particular PCD 18 in the vehicle which will have a varying signal strength based on the proximity of such PDC 18 to the antenna 20 and 21). As noted above, the signal PCD_STATUS includes the device name for the PCD 18, as such, the controller 16 is capable of comparing the recorded signal strength for the same PCD 18 (or device name). By comparing the signal strength for the signal PCD_STATUS for the same PCD 18, the controller 16 may determine the location of the PCD 18 in the vehicle as exhibited by the operations below.

In operation 60, the controller 16 determines whether the signal strength of the signal PCD_STATUS as received at the antenna 21 (in the passenger zone) for the PCD 18 is greater than the signal strength of the signal PCD_STATUS as received at the antenna 20 (in the driver zone) for the same PCD 18. If the above condition is true, then the method 50 moves to operation 62. If the above condition is not true, then the method 50 moves to operation 64. In one example, in the event the signal strength for the signal PCD_STATUS as received at the antenna 21 (in the passenger zone) is generally similar to, or slightly greater than the signal strength for the signal PCD_STATUS as received at the antenna 20 (in the driver zone) then the controller 16 may determine that the PCD 18 is located in the driver zone 26 as opposed to the passenger zone. The default location for the PCD 18 may be set to the driver zone 26 in this instance to account for the scenario in which a large signal strength gap may not be present. It is recognized that this condition may vary based on the criteria of a particular implementation.

In operation 62, the controller 16 determines that the PCD 18 is in the passenger zone 28 and transmits the signal ZONE_ID to the PCD 18 to notify the PCD 18 that it is in the passenger zone 28.

In operation 64, the controller 16 determines that the PCD 18 is in the driver zone 26 and transmit the signal ZONE_ID to the PCD 18 to notify the PCD 18 that it is in the driver zone 26.

Figure 4:
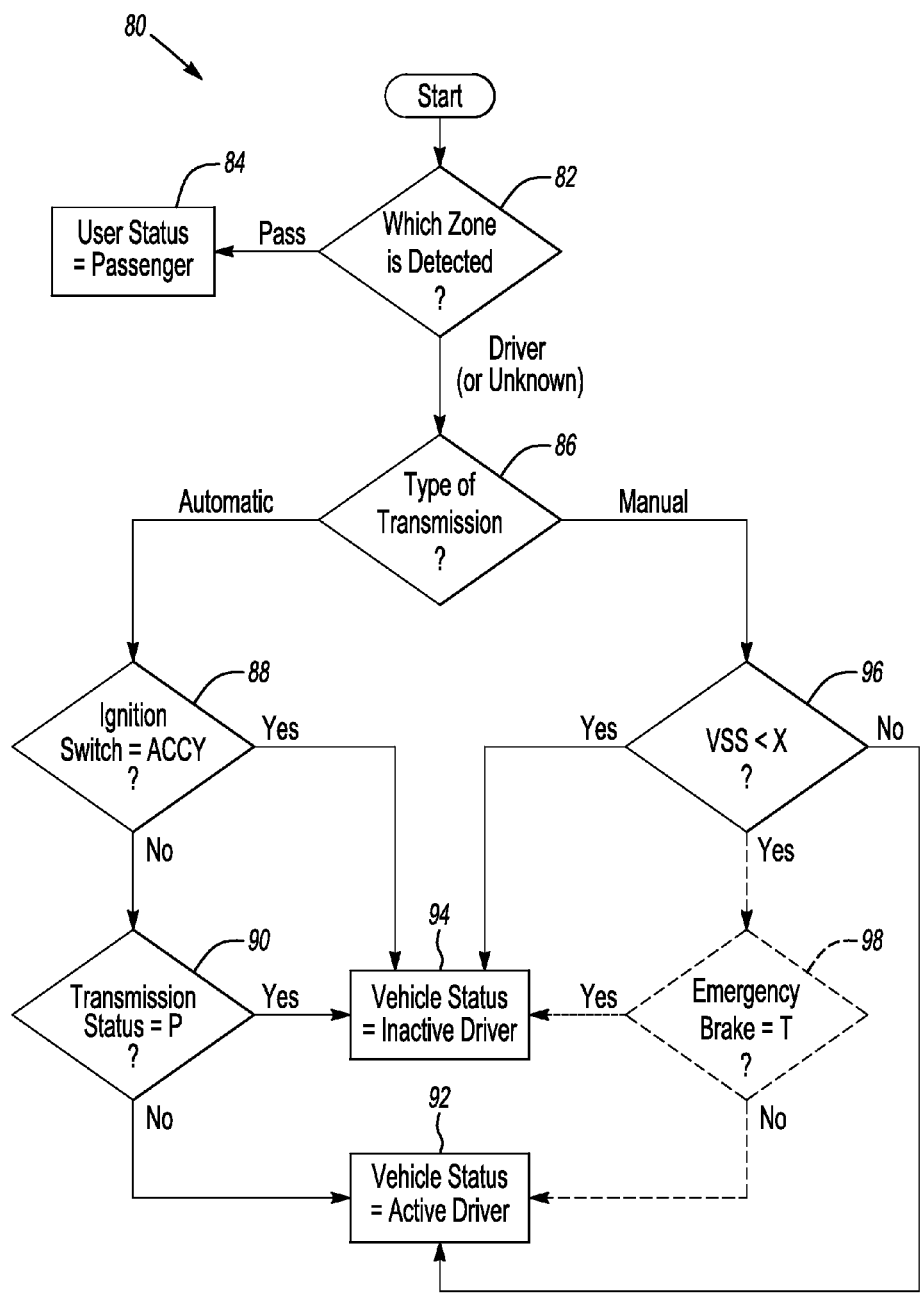
FIG. 4 depicts a method for determining whether the driver is in one of an active state or an inactive state so that the PCD is capable of being controlled based on the state in accordance to one embodiment.

FIG. 4 depicts a method 80 for determining whether the driver is in one of an active state or an inactive state so that the PCD 18 is capable of being controlled based on the state in accordance to one embodiment. The particular order of the operations in the method 80 when executed can be in any order and are not to be limited to only being performed sequentially. The order of the operations may be modified or varied based on the desired criteria of a particular implementation.

In operation 82, the controller 16 determines which zone each PCD 18 is in (e.g., the method 50 is executed as noted above). Presumably, if there are more than two PCDs 18 in the vehicle, one will be in the passenger zone 28 and the other in the driver zone 26. For the PCD(s) 18 detected to be in the passenger zone 28, the method 80 moves to operation 84. For the PCD 18 detected to be in the driver zone 26, the method 80 moves to operation 86.

In operation 84, the controller 16 determines that the PCD 16 is in the passenger zone 28 (see operation 68 in connection with FIG. 3). At this point, the PCD(s) 18 will not impose restrictions since it is detected to be in the passenger zone 28.

In operation 86, the controller 16 determines the transmission type for the vehicle based on the signal TRANS_TYPE. As noted above, the signal TRANS_TYPE indicates whether the vehicle includes an automatic or manual transmission. If the vehicle includes an automatic transmission, then the method 80 moves to operation 88. If the vehicle includes a manual transmission, then the method 80 moves to operation 96.

In operation 88, the controller 16 determines whether the key in ignition is in the Accessory ("ACCY") state by monitoring the signal IGN_SW_STS. If the key in ignition is not in the ACCY state, then the method 80 moves to operation 90. If so, then the method 80 moves to operation 94. If the vehicle is in the ACCY state, then it is presumed that the vehicle is in a PARK and restrictions on the PCD 18 (even if in the driver zone 26) is not necessary.

In operation 90, the controller 16 determines the transmission status by monitoring the signal TRANS_STATUS. If the signal indicates that that the vehicle is in any state other than PARK, then the method 90 moves to operation 92. If the signal indicates that the vehicle is in PARK, then the method 90 moves to operation 94. It is recognized that vehicle speed may be used in place of transmission status. For example, if the vehicle speed is determined to be greater than a predetermined vehicle speed, then PCD 18 restriction may be imposed.

In operation 92, the controller 16 determines that the driver is an active driver (e.g., the vehicle is in a non-stopped state, or may be moving above a predetermined vehicle speed). The active state generally corresponds to a state in which PCD 18 operation may be restricted completely or partially (such as in a hands free mode or voice recognition is allowed). The controller 16 transmits the signal VEHICLE_STATUS indicating that the vehicle is in a non-stopped state (e.g., the driver (or vehicle) is active) to the PCD 18 that is detected to be in the driver zone 26. The PCD 18 may then restrict its operation by disabling operation for the driver when the vehicle is in the non-stopped state or may enable voice control operation such that the driver can only use voice input via the controller 16 (e.g., force on hands free operation) to operate and engage in conversation with another party.

In operation 94, the controller 16 determines that the driver is inactive (e.g., the vehicle is in a stopped state). That is, the driver may be parked or stopped at a light or other location. The inactive state generally corresponds to a state in which full PCD 18 operation may be allowed. In this condition, the controller 16 transmits the signal VEHICLE_STATUS indicating that the vehicle is in a stopped state (e.g., the driver (or vehicle) is inactive) to the PCD 18 that is detected to be in the driver zone 26. The PCD 18 may then allow full operation. Meaning, the driver may be able to directly physically control the PCD 18 via touch entry or may continue to use voice control operation (or hands free operation).

In operation 96, the controller 16 determines whether the vehicle speed as indicated on the signal VEH_SPEED is below a predetermined vehicle speed. If the vehicle speed is below the predetermined vehicle speed, then the method 80 moves to operation 94 and the driver is classified as an inactive driver and full PCD 18 operation can be maintained by the driver if inactive. If the vehicle speed is above the predetermined vehicle speed, then the method 80 may optionally move to operation 92.

In another example, in operation 98, park brake status may be used in place of the vehicle speed for determining whether the driver is active or inactive. For example, the controller 16 determines whether the park brake is engaged by monitoring the signal PARK_BK_STATUS. In this condition, the vehicle is equipped with a manual transmission as noted in connection with operation 86. The controller 16 may monitor park brake status as a mechanism to determine if the vehicle is in a park or non-park state since the controller 16 may not receive an indication of PRNDL status (or transmission status) from an automatic transmission because the vehicle is not equipped with an automatic transmission. If the park brake is engaged, then the method 80 moves to operation 94 where the driver is an inactive driver and full PCD 18 operation may be allowed for the driver. If not, then the method 80 may move directly to operation 92 where the driver is classified as an active driver and the PCD 18 restrictions are imposed.

It is recognized for manual transmission that full PCD 19 operation may be allowed if the vehicle is in PARK or when the driver is detected to be less than a predetermined speed (e.g., vehicle is stopped at a stop light or for some other reason while not in PARK). In another embodiment, operations 96 and 98 may be combined such that both vehicle speed and park brake status are monitored together to determine if the driver is active or inactive. This may improve resolution in determining whether the driver is active or inactive.

FIG. 5 depicts a system 110 for monitoring the location of the PCD 18 in accordance to another embodiment. The system 110 is generally similar to the system 10, however the system 110 is arranged to include a restraint control module (RCM) 112 and an occupant classification system (OCS) 114 that is operably coupled to the device 12. The OCS 114 generally includes a single position sensor positioned in the front passenger seat of the vehicle. The position sensor is configured to transmit a signal to the RCM 112 to indicate whether an occupant is positioned in the front passenger seat of the vehicle.

The RCM 112 receives the signal from the position sensor and transmits a signal OCCUPANT_STATUS to the device 12 (or directly to the controller 16) to indicate whether an occupant is in the front passenger's seat of the vehicle. The system 110 determines that a driver is in the vehicle by monitoring ignition status and/or vehicle speed. For example, in the event the key is in the ignition and in any position other than OFF or vehicle speed is detected, such conditions indicate that the driver is in the vehicle. Accordingly, by monitoring these conditions and the use of a single position sensor in the front passenger seat to determine occupant status (i.e., driver and/or front passenger in vehicle) a more efficient and less expensive occupant detection system may be employed. In the event only the driver is detected to be in the vehicle, the controller 16 may increase the size of the driver zone 26 such that it encompasses not only the area where a driver may be generally situated in the vehicle but to also include the front passenger area in the passenger zone 28 to prevent the driver from leaning over into the passenger seat in an attempt to use the PCD 18 in a non-restricted manner.

Figure 6A:
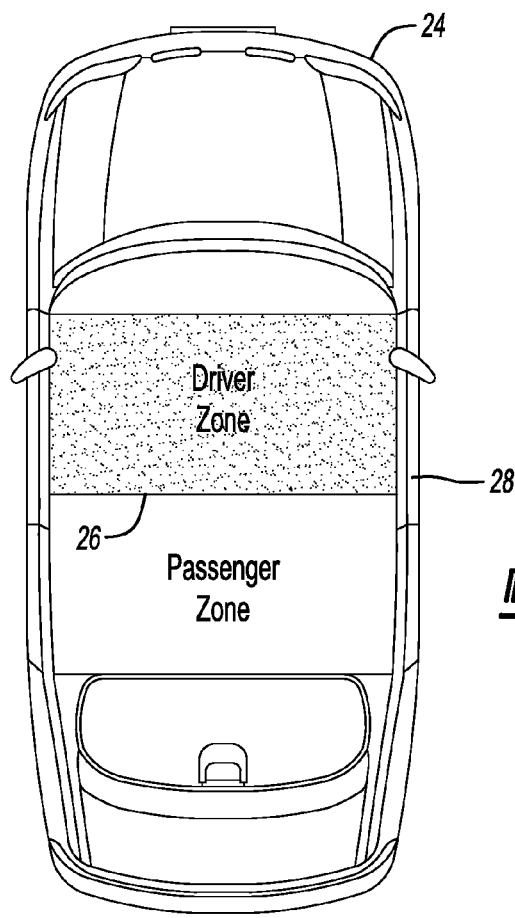
FIG. 6A-6B depict various driver zones and passenger zones as used in connection with an occupant classification system in accordance to one embodiment.
Figure 6B:
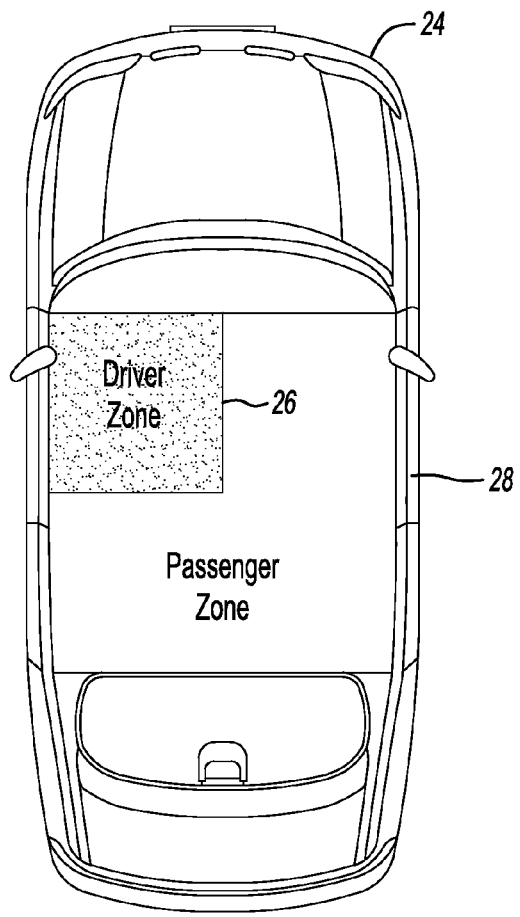

FIG. 6A depicts the increase in the driver zone 28 in the event the controller 16 determines that only the driver is in the vehicle. As depicted, the driver zone 26 is extended to protrude onto the front passenger seat of the passenger zone 28. In another example, the entire interior section of the vehicle can be characterized as a driver zone 26 in the event only the driver is detected to be in the vehicle. In this case, so long as the driver is active as noted in connection with FIG. 4, the PCD 18 may restrict PCD 18 operation for the driver irrespective of the location of the PCD 18 in the vehicle. By extending the driver zone to include at least a portion of the passenger zone or to include the entire passenger zone in the event a front passenger is not within the vehicle, the controller 16 cannot be tricked into determining that the PCD 18 is now in the passenger zone 28 if the driver leans over into the passenger zone because the controller 16 knows that only the driver is in the vehicle. FIG. 6B depicts the driver zone 26 being in a normal state in the event the driver is in the vehicle and the front passenger is determined to be in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for locating a personal communication device (PCD) in a vehicle, the system comprising:
a controller for being operably coupled to a first antenna positioned in a driver zone of the vehicle and a second antenna positioned in a passenger zone of the vehicle, the controller being configured to:
receive a first signal from the PCD at the first antenna;
measure a signal strength of the first signal received at the first antenna to generate a first signal strength value;
receive the first signal from the PCD at the second antenna;
measure a signal strength of the first signal received at the second antenna to generate a second signal strength value;
determine whether the first signal at the first antenna and the first signal at the second antenna are received within a predetermined amount of time from one another;
compare the first signal strength value to the second signal strength value responsive to the first signal at the first antenna and the first signal at the second antenna being received within the predetermined amount of time;
determine that the PCD is in the driver zone in response to the first signal strength value being greater than the second signal strength value by a predetermined value;

receive an occupant status signal indicative of whether a passenger is positioned in a front passenger seat; and determine that the PCD is located in the driver zone irrespective of the PCD being physically positioned in the passenger zone in the event the occupant status signal indicates that the passenger is not positioned in the front passenger seat.

2. The system of claim 1 wherein the controller is further configured to wirelessly transmit a zone identification signal indicative of whether the PCD is in one of the driver zone and the passenger zone to the PCD.

3. The system of claim 2 wherein the controller is further configured to transmit a vehicle status signal indicative of the vehicle being in one of a stationary state and a non-stationary state to the PCD such that the PCD restricts usage thereof in response to the zone identification signal indicating that the PCD is in the driver zone and the vehicle status signal indicating that the vehicle is in the non-stationary state.

4. The system of claim 2 wherein the controller is further configured to wirelessly transmit a vehicle status signal indicative of the vehicle being in one of a stationary state and a non-stationary state to the PCD.

5. The system of claim 4 wherein the stationary state corresponds to the vehicle being in one of a PARK condition and ignition status being in an ACCESSORY state.

6. The system of claim 5 wherein the non-stationary state corresponds to one of the vehicle having a vehicle speed that is greater than a predetermined vehicle speed and a park brake of the vehicle being disengaged.

7. A method for locating a personal communication device (PCD) in a vehicle, the method comprising:
receiving a first signal from the PCD at a first antenna located in a driver zone in the vehicle;
measuring a signal strength of the first signal received at the first antenna to generate a first signal strength value;
receiving the first signal from the PCD at a second antenna located in a passenger zone in the vehicle;
measuring a signal strength of the first signal received at the second antenna to generate a second signal strength value;
determining whether the first signal at the first antenna and the first signal at the second antenna are received within a predetermined amount of time from one another;
comparing the first signal strength value to the second signal strength value responsive to the first signal at the first antenna and the first signal at the second antenna being received within the predetermined amount of time;
determining that the PCD is in the passenger zone in response to the e second signal strength value being greater than the first signal strength value by a predetermined value;
receiving an occupant status signal indicative of whether a passenger is positioned in a front passenger seat; and
determining that the PCD is located in the driver zone irrespective of the PCD being physically positioned in the passenger zone in the event the occupant status signal indicates that the passenger is not positioned in the front passenger seat.

8. The method of claim 7 further comprising wirelessly transmitting a zone identification signal indicative of whether the PCD is in one of the driver zone and the passenger zone to the PCD.

9. The method of claim 8 further comprising transmitting a vehicle status signal indicative of the vehicle being in one of a stationary state and a non-stationary state to the PCD such that the PCD restricts usage thereof in response to the zone identification signal indicating that the PCD is in the driver zone and the vehicle status signal indicating that the vehicle is in the non-stationary state.

10. The method of claim 8 further comprising wirelessly transmitting a vehicle status signal indicative of the vehicle being in one of a stationary state and a non-stationary state to the PCD.

11. The method of claim 10 wherein the stationary state corresponds to the vehicle being in one of a PARK condition and ignition status being in an ACCESSORY state.

12. The method of claim 11 wherein the non-stationary state corresponds to one of the vehicle having a vehicle speed that is greater than a predetermined vehicle speed and a park brake of the vehicle being disengaged.

13. A method comprising:
receiving a first signal from the PCD at a first antenna located in a driver zone of a vehicle;
recording a signal strength of the first signal received at the first antenna to generate a first signal strength value for the first signal received at the first antenna;
receiving the first signal from the PCD at a second antenna located in a passenger zone of the vehicle;
recording a signal strength of the first signal received at the second antenna to generate a second signal strength value for the first signal received at the second antenna;
determining whether the first signal at the first antenna and the first signal at the second antenna are received within a predetermined amount of time from one another;
comparing the first signal strength value to the second signal strength value responsive to the first signal at the first antenna and the first signal at the second antenna being received within the predetermined amount of time;
determining that the PCD is in the driver zone in response to the first signal strength value being greater than the second signal strength value by a predetermined value;
receiving an occupant status signal indicative of whether a passenger is positioned in a front passenger seat; and
determining that the PCD is located in the driver zone irrespective of the PCD being physically positioned in the passenger zone in the event the occupant status signal indicates that the passenger is not positioned in the front passenger seat.

14. The method of claim 13 wherein receiving the first signal from the PCD at the first antenna located in the driver zone further comprises receiving the first signal from the PCD at the first antenna over a Bluetooth protocol.

15. The method of claim 13 wherein receiving the first signal from the PCD at the second antenna located in the passenger zone further comprises receiving the first signal from the PCD at the first antenna over a Bluetooth protocol.

* * * * *